US007698385B2

(12) United States Patent
Geppert et al.

(10) Patent No.: US 7,698,385 B2
(45) Date of Patent: Apr. 13, 2010

(54) METHOD AND APPARATUS FOR DESIGNING WEB SERVICES USING A SEQUENCE AND MULTIPLEX ARCHITECTURAL PATTERN

(75) Inventors: Birgit A. Geppert, Basking Ridge, NJ (US); Frank M. Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1595 days.

(21) Appl. No.: 10/955,916

(22) Filed: Sep. 30, 2004

(65) Prior Publication Data
US 2006/0095544 A1    May 4, 2006

(51) Int. Cl.
*G06F 13/00* (2006.01)
(52) U.S. Cl. .................. 709/219; 709/226; 709/250
(58) Field of Classification Search .............. 709/217, 709/219, 223, 225, 227, 229, 250
See application file for complete search history.

(56) References Cited

U.S. PATENT DOCUMENTS

2005/0091386 A1* 4/2005 Kuno et al. ............... 709/228
2005/0096960 A1* 5/2005 Plutowski et al. ............ 705/8

OTHER PUBLICATIONS

Geppert et al., "Collaboration-based Design—Exemplified by the Internet Session Initiation Protocol (SIP)," WICSA, Amsterdam, The Netherlands, pp. 158—, Amsterdam, The Netherlands (2001).

Geppert et al., "Effects of Refactoring Legacy Protocol Implementations: A Case Study," IEEE Metrics, Chicago, Illinois pp. 14-25 (2004).

Robler et al., "CoSDL—An Experimental Language for Collaboration Specification," SAM, Aberystwyth, UK, pp. 1-20 (2002).

Roessler et al., "Collaboration-based Design of SDL Systems," SDL Forum, pp. 72-89 (2001).

* cited by examiner

*Primary Examiner*—Viet Vu
(74) *Attorney, Agent, or Firm*—Joseph B. Ryan; Jason Paul DeMont; Wayne S. Breyer

(57) ABSTRACT

Methods and apparatus are disclosed for designing a Web service that processes one or more composite messages. The same techniques may be applied to the design of clients of the Web service. The Web service is comprised of service logic and compositional logic. The service logic is comprised of a plurality of message handlers that process micro-messages of one or more composite messages. The compositional logic is comprised of a plurality of protocol demultiplexers that implement Web service functionality for demultiplexing, sequencing, and multiplexing one or more composite messages. The compositional logic is separated from the service logic, such that the service logic does not include operations for demultiplexing, sequencing, or multiplexing the composite messages.

11 Claims, 11 Drawing Sheets

FIG. 4A

```xml
<?xml version="1.0"?>
<definitions targetnamespace="http://example.com/ourFlightSearch.xsd">
   ...
   <interface name="FlightSearch">
      <operation name="F_3">
            <event name="Call_F_3">
                  <input message="F_A"/>
            </event>
            <event name="Return_F_3">
                  <output message="F_B"/>
            </event>
      </operation>
   </interface>
   <interface name="WeatherInquiry">
      <operation name="W_3">
            <event name="Call_W_3">
                  <input message="W_A"/>
            </event>
            <event name="Return_W_3">
                  <output message="W_C"/>
            </event>
      </operation>
      <operation name="W_4">
            <event name="Call_W_4">
                  <input message="W_D"/>
            </event>
            <event name="Return_W_4">
                  <output message="W_B"/>
            </event>
      </operation>
   </interface>
```

400, 410 (FlightSearch), 420 (WeatherInquiry)

FIG. 4B 430-1

```xml
<interface name="Booking">
    <operation name="B_6">
        <event name="Call_B_6">
            <input message="B_A"/>
        </event>
        <event name="RETURN_B_6_SUCCESS" value="SUCCESS">
            <output message="B_C"/>
        </event>
        <event name="Return_B_6_FAILURE" value="FAILURE">
            <outfault messageReference="B_C" message ="B_B"/>
        </event>
    </operation>
    <operation name="B_7">
        <event name="Call_B_7">
            <input message="B_D"/>
        </event>
        <output />
    </operation>
    <operation name="B_8">
        <event name="Call_B_8"">
            <input message="B_E"/>
        </event>
        <output />
    </operation>
    <operation name="B_9">
        <event name="Call_B_9">
            <input />
        </event>
        <event name="RETURN_B_9">
            <output message="B_F"/>
        </event>
    </operation>
    <operation name="B_10">
        <event name="Call_B_10">
            <input />
        </event>
        <event name="RETURN_B_10">
            <output message="B_G"/>
        </event>
    </operation>
```

FIG. 4C

```xml
<operation name="B_11">
    <event name="Call_B_11">
        <input />
    </event>
    <event name="RETURN_B_11">
        <output message="B_H"/>
    </event>
</operation>
<operation name="B_12">
    <event name="Call_B_12">
        <input message="B_I"/>
    </event>
    <event name="Return_B_12">
        <output />
    </event>
</operation>
<operation name="B_13">
    <event name="Call_B_13">
        <input message="B_J"/>
    </event>
    <event name="Return_B_13">
        <output />
    </event>
</operation>
<operation name="abortBooking">
    <event name="Call_abortBooking">
        <input />
    </event>
    <output message="ABORT_BOOKING"/>
</operation>
</interface>
```

FIG. 4D

```
                                                                    ┌─ 440
<interface name="Authentication">
    <operation name="A_5">
        <event name="Call_A_5">
            <input message="A_A"/>
        </event>
        <event name="Return_A_5">
            <output message="A_B"/>
        </event>
    </operation>
    <operation name="A_6">
        <event name="Call_A_6">
            <input message="A_C"/>
        </event>
450 ──▶ <event name="Return_A_6_SUCCESS" value="SUCCESS">
            <output message="A_D"/>
        </event>
        <event name="Return_A_6_FAILURE" value="FAILURE">
            <outfault messageReference="A_D" message="A_E"/>
        </event>
    </operation>
    <operation name="abortAuthentication">
        <event name="Call_abortAuthentication">
            <input />
        </event>
        <output message="ABORT_AUTHENTICATION"/>
    </operation>
</interface>
```

<!-- Causal dependency between Booking and Authentication: Read "event1 causally depends on event2" -->
<causalDependency event1="Call_B_8" event2="Return_A_6_SUCCESS"/>

<!-- Causal dependencies needed for exception handling: Read "event1 causally depends on event2" -->
<causalDependency event1="Call_abortBooking" event2="Return_A_6_FAILURE"/>
<causalDependency event1="Call_abortAuthentication" event2="Return_B_6_FAILURE"/>

<!-- Causal dependency within WeatherInquiry: Read "event1 causally depends on event2" -->
<causalDependecny event1="Call_W_4" event2="Return_W_3"/>

<!-- Causal dependencies within Booking: Read "event1 causally depends on event2" -->
<causalDependency event1="Call_B_7" event2="Return_B_6_SUCCESS"/>
<causalDependency event1="Call_B_8" event2="Retunr_B_6_SUCCESS"/>
<causalDependency event1="Call_B_11" event2="Return_B_8"/>
<causalDependency event1="Call_B_9" event2="Return_B_12"/>
<causalDependency event1="Call_B_10" event2="Return_B_13"/>
<causalDependency event1="Call_B_12" event2="Return_B_11"/>
<causalDependency event1="Call_B_13" event2="Return_B_11"/>

<!-- Causal dependency within Authentication: Read "event1 causally depends on event2" -->
<causalDependency event1="Call_A_6" event2="Return_A_5"/>
```

FIG. 4F

```
<!-- Message Demultiplexing -->
<messageDeMux name="F_A_W_A">
    <input message="F_A"/>
    <input message="W_A"/>               } 472
</messageDeMux>
<messageDeMux name="B_A_A_A">
    <input message="B_A"/>
    <input message="A_A"/>
</messageDeMux>
<messageDeMux name="B_D_empty">
    <input message="B_D"/>
</messageDeMux>
<messageDeMux name="B_E_A_C">
    <input message="B_E"/>
    <input message="A_C"/>
</messageDeMux>
<messageDeMux name=" empty_W_D ">
    <input message="W_D"/>
</messageDeMux>
<messageDeMux name="B_I_empty">
    <input message="B_I"/>
</messageDeMux>
<messageDeMux name="B_J_empty">
    <input message="B_J"/>
</messageDeMux>
```

```xml
<!-- Message Multiplexing -->
<messageMux name=" empty_W_C ">
    <output message="W_C"/>
</messageMux>
<messageMux name="B_C_A_B">
    <output message="B_C"/>        } 482
    <output message="A_B"/>
</messageMux>
<messageMux name="B_H_empty">
    <output message="B_H"/>
</messageMux>
<messageMux name="F_B_W_B">
    <output message="F_B"/>
    <output message="W_B"/>
</messageMux>
<messageMux name="B_F_A_D">
    <output message="B_F"/>
    <output message="A_D"/>
</messageMux>
<messageMux name="B_G_A_D">
    <output message="B_G"/>
    <output message="A_D"/>
</messageMux>

<!-- Message multiplexing needed for exception handling -->
<messageMux name="B_B_ABORT_AUTHENTICATION ">
    <output message="B_B"/>
    <output message="ABORT_AUTHENTICATION"/>
</messageMux>
<messageMux name=" ABORT_BOOKING_A_E ">
    <output message=" ABORT_BOOKING"/>
    <output message="A_E"/>
</messageMux>

</definitions>
```

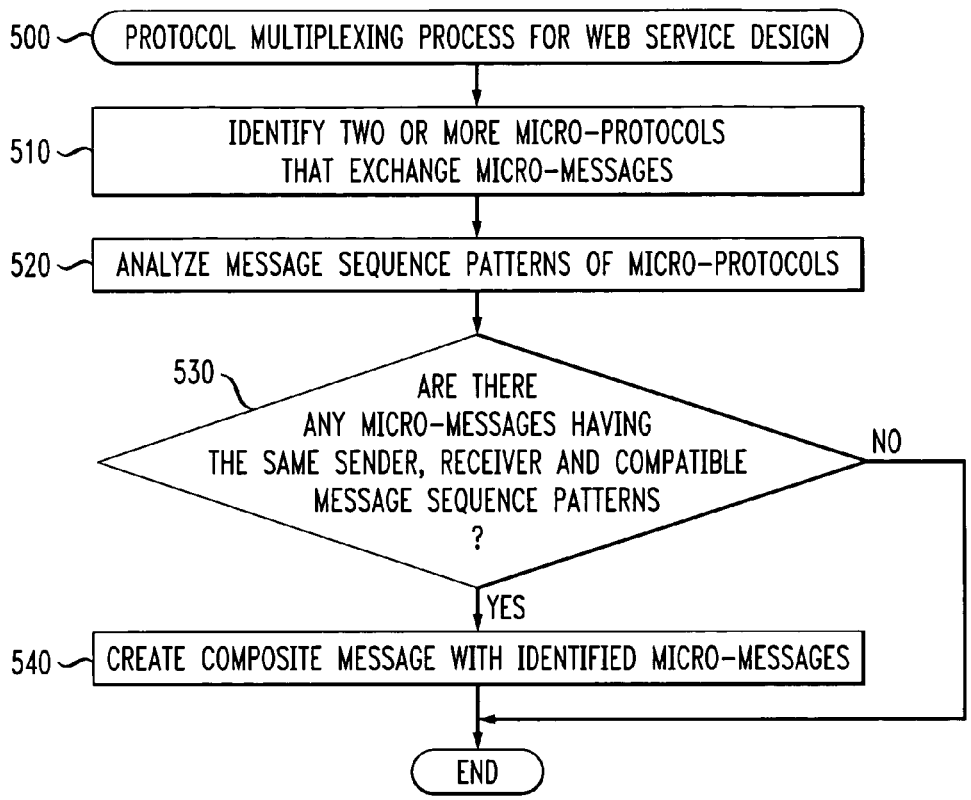
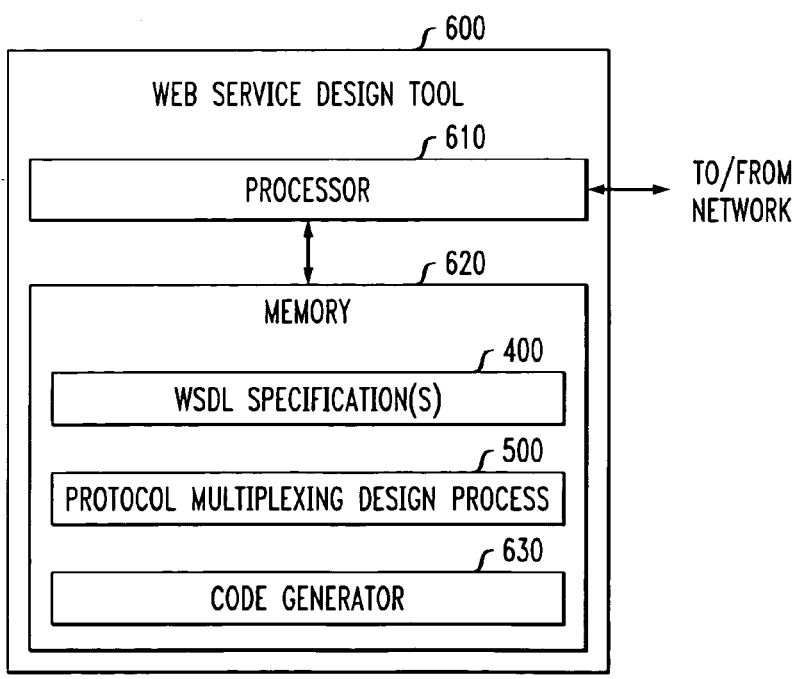

US 7,698,385 B2

METHOD AND APPARATUS FOR DESIGNING WEB SERVICES USING A SEQUENCE AND MULTIPLEX ARCHITECTURAL PATTERN

CROSS-REFERENCE TO RELATED APPLICATIONS

The present application is related to U.S. patent application Ser. No. 10/955,915, entitled "Method and Apparatus for Specifying Web Service Interfaces and Processing Web Service Messages Using Protocol Multiplexing,", filed contemporaneously herewith and incorporated by reference herein.

FIELD OF THE INVENTION

The present invention relates generally to methods and apparatus for composing Web services, and, more particularly, to methods and apparatus for Web services that employ composite messages.

BACKGROUND OF THE INVENTION

Web services are distributed computing applications that can be invoked across the Internet. Web services are generally designed so that they can interact with one another. Thus, a Web service should be interoperable in order to exchange messages with other Web services and clients over a network. Web services standards based on the eXtensible Markup Language (XML), for example, such as the Simple Object Access Protocol (SOAP) and the Web Services Description Language (WSDL), provide a high level of interoperability across platforms, programming languages and applications.

A Web service defines a communication protocol between the service and its clients for the exchange of messages. Mechanisms for flexible composition of Web services greatly simplify development of new services with integrated and value added functionality. A number of techniques have been developed for composing Web services. The Business Process Execution Language for Web Services (BPEL), for example, is one proposed description language that supports the composition of Web services. See, T. Andrews et al., Business Process Execution Language for Web Services, Version 1.1, 2003. BPEL can describe behavior of a Web service that combines operations of existing Web services (specified in WSDL) into an integrated and value added service.

As Web service interfaces and their choreographies grow in complexity, rapid and reliable development of interoperable services and clients becomes more and more of a challenge. For a composite Web service, a composite protocol can be created, based on the protocols defined by its sub-services and value added functionality. The inherent structure of the protocol between sub-services, the composite Web service, and its clients is key for structuring the specification of the composite Web service and for structuring the internal design of the composite Web service and its clients. Specification structure and internal design structure determine most important quality attributes of a Web services solution such as interoperability, maintainability, testability, and changeability.

A need therefore exists for a flexible composition mechanism that allows structuring a Web service protocol into self-contained micro-protocols. A further need exists for mechanisms to impose the inherent structure of a Web service protocol onto the structure of a Web service specification and onto the internal design structure of a Web service and its clients.

SUMMARY OF THE INVENTION

Generally, methods and apparatus are disclosed for designing a Web service that processes one or more composite messages. The same techniques may be applied to the design of clients of the Web service. The Web service is comprised of service logic and compositional logic. The service logic is comprised of a plurality of message handlers that process micro-messages of one or more composite messages. The compositional logic is comprised of a plurality of protocol demultiplexers that implement Web service functionality for demultiplexing, sequencing, and multiplexing one or more composite messages. According to one aspect of the present invention, the compositional logic is separated from the service logic, such that the service logic does not include operations for demultiplexing, sequencing, or multiplexing the composite messages.

According to another aspect of the invention, each of the message handlers are associated with exactly one collaboration of a Web service. The compositional logic includes multiplex and demultiplex operations that implement protocol multiplexing. The compositional logic may also include sequence operations that implement protocol sequencing. Code may optionally automatically be generated for the compositional logic.

A more complete understanding of the present invention, as well as further features and advantages of the present invention, will be obtained by reference to the following detailed description and drawings.

BRIEF DESCRIPTION OF THE DRAWINGS

FIGS. 4A through 4G, collectively, illustrate an exemplary WSDL specification in accordance with the present invention that may be used to specify the composite reservation service of FIG. 2 and may be used as input to the code generator of FIG. 3;

FIG. 5 is a flow chart describing an exemplary implementation of a Web service design process using protocol multiplexing; and FIG. 6 is a schematic block diagram of an exemplary Web service design tool incorporating features of the present invention.

DETAILED DESCRIPTION

Figure 1:
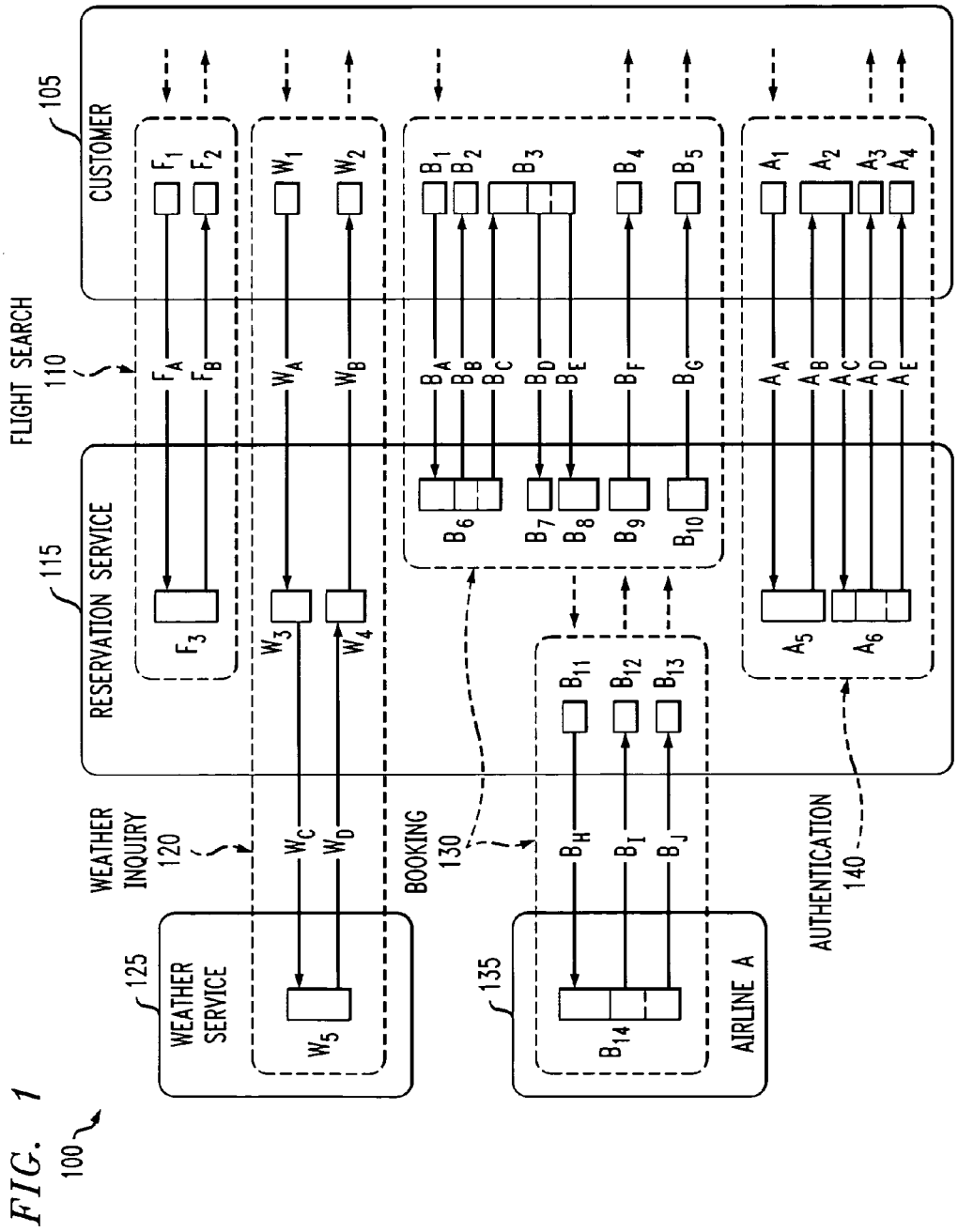
FIG. 1 illustrates a conventional exemplary flight reservation service that illustrates the decomposition of a composite protocol into micro-protocols in accordance with the present invention.

The present invention recognizes that for Web services, multiple agents collaborate to accomplish certain tasks. These agents include at least a Web service and its clients. In the case of composite Web services, the collaboration involves one or more sub-services, the composite Web service, and one or more clients of the composite service. More sophisticated topologies are also possible where, for example, the clients collaborate with multiple composite services, which in turn collaborate with other composite services and so on. This collaboration-based view emphasizes the communication protocols that agents apply for accomplishing a common task. As opposed to existing technologies, the present invention considers the problem of Web services composition mainly as a problem of protocol composition and provides methods and apparatus for flexible composition of protocols in the context of Web services. In particular, the present invention utilizes the inherent structure of Web service protocols for structuring the interface specification of a Web service and for structuring the internal design of a Web service and its clients. The applied protocol composition mechanisms compose sub-protocols (referred to herein as "micro-protocols") in a non-intrusive way.

Protocol composition has two aspects to it. First, micro-protocols do not execute in isolation. They may depend on each other in the sense that one micro-protocol provides data and conditions within each of the involved protocol agents that other micro-protocols rely on. As a consequence, protocol composition must enforce a certain execution order among micro-protocols, which is called "protocol sequencing". Second, even though micro-protocols define their own message sequences, it is not always effective for the composite protocol to transmit these messages separately over the network. As a consequence, protocol composition must be able to simultaneously execute various micro-protocols over the same message sequence, which is referred to as "protocol multiplexing".

While the concepts of protocol sequencing are already in practice, the concepts of protocol multiplexing have not been applied to achieve a more effective modularization of Web services specifications and the internal design of Web services and their clients. The present invention provides methods and apparatus for multiplexing Web service protocols and imposing the resulting protocol structure onto a Web service specification and its internal design. In particular, the disclosed protocol multiplexing mechanism allows composite messages to be transmitted over the network, instead of sending messages separately, if they should belong to different micro-protocols.

Structuring a Web service specification according to the inherent protocol structure (in particular, the structure resulting from protocol multiplexing) has many advantages. Among them are less complexity of a Web service specification, incremental development and testing of clients, and more reliable development of interoperable clients. Similarly, there are many benefits in structuring the internal design of Web services and their clients according to the inherent protocol structure (in particular, the structure resulting from protocol multiplexing) such as automated implementation of compositional logic, automated and modular testing, and more efficient evolution of composite Web services. Among other features, the architectural pattern of the present invention requires that the service logic of a Web service is separate from the compositional logic. Thus, the sequence and multiplex functions that implement the protocol composition aspects of the present invention should be kept separate from the core functionality of the involved sub-services. In this manner, code for the sequence and multiplex functions can be automatically generated and the flexible design of Web services allows them to easily add, delete, maintain, or change sub-services.

EXAMPLE COMPOSITE WEB SERVICE

FIG. 1 illustrates an exemplary flight reservation application 100 that is used as a running example to illustrate the inherent structure of a Web service protocol as a composition of micro-protocols and to illustrate how protocol structure relates to the structure of a Web service specification and its internal design. The exemplary flight reservation application 100 is comprised of four micro-protocols 110, 120, 130, 140, from which a composite flight reservation service is later assembled. Each of the four micro-protocols provides access to a separate sub-service, namely a weather service, a booking service, a flight search, and an authentication service.

Flight Search 110

As shown in FIG. 1, a flight search 110 involves two agents that interact in a two-way handshake: the customer 105 that wants to search for available fares and the reservation service 115 that has the database for conducting the search. The customer 105 first sends a message $F_A$ with flight date information to the reservation service 115, which then returns a message $F_B$ with a list of offered fares. The upper part of FIG. 1 illustrates the micro-protocol for the flight search 110. Vertical boxes denote message handlers capable of processing and generating messages. For the flight search 110, message handler $F_1$, which belongs to the customer agent 105, is responsible for generating message $F_A$. Message handler $F_3$, which belongs to the reservation service agent 115, then processes message $F_A$. Message handler $F_3$ also generates the response message $F_B$, which is eventually processed by message handler $F_2$.

It is noted that message processing and generation does not include the actual receiving and sending of the message. As discussed further below, receiving and sending are conceptually separated tasks that are accomplished before and after a message handler is invoked. Message handlers are closely related to operations described in a WSDL document, but differ in certain aspects. Message handlers according to the present invention have a more specialized semantics than WSDL operations. While a WSDL operation must only describe visible behavior at the Web service interface, a message handler reveals more details about the underlying protocol structure.

Booking 130

As shown in FIG. 1, three agents participate in the micro-protocol for booking a specific fare. The customer 105 that wants to buy an air fare, the reservation service 115 that orders the fare on behalf of the customer 105, and the airline 135 that sells air fares. Booking 130 requires a four-way handshake because the reservation service 115 must ensure that customers 105 review and confirm fare rules before purchasing the air fare.

For a successful booking interaction, the customer 105 first sends a message $B_A$ to the reservation service 115 specifying the requested outbound and return flight. The reservation service 115 then responds with a message $B_C$ that contains the fare rules. After the customer 105 has confirmed the fare rules (message $B_E$), the reservation service 115 sends a message $B_H$ to the airline 135 that contains the flight information for actually booking the fare. The confirmation message $B_I$ from the airline 135 is then relayed back to the customer 105 (message $B_F$), which completes successful booking of a flight.

FIG. 1 also includes possible failure scenarios. First, the customer 105 may send a message $B_A$ with invalid flight information, resulting in a reject message $B_B$. Second, it may happen that the customer 105 rejects fare rules (message $B_D$) or the airline 135 refuses to book the flight (message $B_J$). Failure and success paths are illustrated as alternative behavior within a message handler. A dashed line within their own vertical box separates alternatives. For instance, message handler $B_6$ generates either message $B_B$ or message $B_C$, but not both.

Authentication 140

Authentication is accomplished by a four-way handshake between customer 105 and reservation service 115. A standard challenge-response protocol is applied where the customer 105 first requests a clear challenge (message $A_A$) and then returns an encrypted token (message $A_C$), which contains the challenge and the customer's password. The reservation service 115 returns message $A_D$ or message $A_E$, depending on whether authentication succeeded or failed, respectively.

Weather Inquiry 120

As shown in FIG. 1, the weather information is not provided by the reservation service 115. Rather, the reservation service 115 relays requests and responses between the customer 105 and the weather service 125. The customer 105 sends a request $W_A$ containing a location and time period for which the customer 105 wants historical weather information. Eventually, the customer 105 will receive daily average values of temperature and precipitation for the specified time period (message $W_B$).

Architectural Pattern Sequence and Multiplex

An architectural pattern defines the component types used for describing software architectures and the relationships among the components (connectors). In the following discussion, the components and connectors of a novel architectural pattern for Web services, referred to herein as "sequence and multiplex", are presented and properties of the architectural pattern are discussed.

Collaborations as Architecture Components

Collaborations are the components of the disclosed architectural pattern for Web services. For each of the rounded and dashed rectangles in FIG. 1, the set of included message handlers is an example of a collaboration. A collaboration encapsulates behavior across agent boundaries that provides a distinct service to its environment. For example, consider the weather inquiry 120 from FIG. 1. Message handlers $W_1$-$W_5$ collaborate in order to provide weather information to the customer 105. Message handler $W_1$ is called from outside the collaboration and requires location and time period as input. Message handler $W_1$ does little more than generating message $W_A$ from the input data. The weather inquiry collaboration then assumes that message $W_A$ will be transmitted to the reservation service 115 and be made available to message handler $W_3$. This implies that message handler $W_3$ eventually receives control, so that message handler $W_3$ can process message $W_A$.

The connectors of the architectural pattern are responsible for transferring messages and control among message handlers. Once message handler $W_3$ gets control, message handler $W_3$ simply transforms message $W_A$ into message $W_C$ and relies on the connectors for transferring message and control to message handler $W_5$. Notice that message handler $W_3$ does not require any pre-conditions to be fulfilled by the environment. Message $W_A$ is all message handler $W_3$ needs to perform its functionality correctly. Message handler $W_5$ does the necessary database lookup and generates message $W_D$. Message handler $W_4$ forwards the results to the customer 105, and eventually message $W_B$ will be processed by message handler $W_2$ which outputs the results to the environment.

Any interaction with the environment (except for connectors) is part of the interface of a collaboration. In the case of a weather inquiry, this would include the signature and semantics of message handler $W_1$ only. However, in general, multiple message handlers may be called from the environment or may require certain pre-conditions to be met. Message handlers could also fulfill certain post-conditions, on which the environment (such as other collaborations) depends. Since message handlers reside on various network nodes, a collaboration interface is distributed.

A "micro-protocol" is a quintuple, MP, equal to (AG, M, sender, receiver, behavior), where AG denotes a finite set of protocol agents exchanging messages, M denotes a finite set of message types being exchanged, sender denotes a function sender: M→AG that maps a message onto its sending protocol agent, receiver denotes a function receiver: M→AG that maps a message onto its receiving protocol agent, and behavior denotes a specification of protocol behavior. For the latter, an existing protocol description language, which allows the set of observable message sequences $<m_1, m_2, \ldots>$, $m_i \in M$ to be derived, can be used. The notation seq(behavior) means the set of all possible message sequences defined by behavior. It is further assumed that each message type has exactly one sender and one receiver.

For example, the micro-protocol, $MP_W$, equal to ($AG_W$, $M_W$, $sender_W$, $receiver_W$, $behavior_W$) for the weather inquiry 125 is defined as follows:

$AG_W$={Weather Service, Reservation Service, Customer},
$M_W$={$W_A$, $W_B$, $W_C$, $W_D$},
$sender_W(W_A)$=Customer, $sender_W(W_B)$ =Reservation Service,
$sender_W(W_C)$=Reservation Service, $sender_W(W_D)$= Weather Service,
$receiver_W(W_A)$=Reservation Service, $receiver_W(W_B)$= Customer,
$receiver_W(W_C)$=Weather Service, $receiver_W(W_D)$=Reservation Service,
seq($behavior_W$)={<>, <$W_A$>, <$W_A$,$W_C$>, <$W_A$,$W_C$,$W_D$>, <$W_A$,$W_C$,$W_D$,$W_B$>}.

While a micro-protocol describes the interface between protocol agents, a collaboration encapsulates an entire micro-protocol and provides a distinct service to its environment. Notice that the notion of a collaboration service is quite different from the common notion of a Web service, which rather refers to the interface between protocol agents.

A collaboration adds the concept of message handlers to a micro-protocol. Message handlers do generate and process the messages of a micro-protocol. Other input that a message handler needs in addition to the processed message can be part of a collaboration's interface. In addition, other output that a message handler produces in addition to the generated messages can be part of a collaboration's interface.

A message handler, $MHANDLER_{MP}$ of a micro-protocol MP is a triple, where $MHANDLER_{MP}$ equals (agent, inbound, OUTBOUND), where agent denotes the protocol agent of MP to which the message handler belongs, inbound denotes a message type from MP that can be processed by the message handler (inbound can be the empty message), and OUTBOUND denotes a set of sets of message types from MP that can be generated by the message handler (OUTBOUND can be empty). Each set in OUTBOUND specifies one possible set of outbound messages that the message handler may generate. If a message handler can generate more than one instance of each message type or a variable number of instances of a message type, OUTBOUND must also assign multiplicities to each message type. It is noted that a message handler can only process messages, for which its agent is a receiver and can only generate messages, for which its agent is a sender. Furthermore, input-output behavior of a message handler (in terms of processed and generated messages) must be consistent with the behavior of its micro-protocol.

FIG. 1 depicts message handlers as vertical boxes which are the origins and destinations of exchanged messages. For instance, message handler $B_6=(agent_{B6}, inbound_{B6}, OUTBOUND_{B6})$, which is part of the booking micro-protocol 130, is defined as follows:

$agent_{B6}$=Reservation Service,
$inbound_{B6}=B_A$,
$OUTBOUND_{B6}=\{\{B_B,\}, \{B_C\}\}$.

Message handler $B_6$ can process message type $B_A$, and it always generates one out of two possible responses, namely either one message of type $B_B$ or one message of type $B_C$. In general, message handlers can generate entire sets of outbound messages.

A collaboration is a quintuple COLL=(MP, MH, PRED, pre, post), where MP denotes a micro-protocol, MH denotes a finite set of message handlers for processing and generating messages from MP, PRED denotes a set of predicates expressing pre and post-conditions for the message handlers from MH, pre denotes a partial function pre: MH→PRED that maps a message handler onto a pre-condition that must be met, so that the message handler can process its inbound message correctly, and post denotes a partial function post: MH×OUTBOUND$_{MH}$→PRED that maps a message handler together with a set of message types, that is an element of its OUTBOUND set, onto a post-condition that holds, when the message handler has generated outbound messages of those types and returned. In addition, the set of message handlers MH must be complete in the sense that for each message type defined by the micro-protocol there is one message handler that generates messages of that type and one message handler that processes messages of that type.

Sequence and multiplex applies collaborations as a means for modularizing a Web service. Collaborations provide a useful abstraction throughout the entire development cycle of a Web service, including design, analysis, implementation, evolution, and testing.

Some message handlers of a collaboration, such as $F_1$, $W_1$, $B_1$, $B_{11}$, and $A_1$ from FIG. 1, are accessible from outside the collaboration, while others are private to the collaboration. In order to trigger processing of a collaboration, a public message handler must be invoked. After that, messages are exchanged, resulting in message handler calls at other protocol agents, which in turn causes new messages to be exchanged. Eventually, the results of the collaboration will be returned to the environment by a callback or similar mechanism.

FIG. 1 shows message handlers $F_2$, $W_2$, $B_4$, $B_5$, $B_{12}$, $B_{13}$, $A_3$, and $A_4$ as being responsible for returning results to the environment. While a collaboration is executing, there are further interactions with the environment. These are specified as pre and post-conditions of individual message handlers. Pre and post-conditions refer to data that is passed in or returned as message handler parameters or otherwise made available by some shared repository. Pre and post-conditions can also refer to other conditions that must be met before a message handler can be invoked or do hold when a message handler returns. Often pre-conditions are fulfilled by other collaborations' post-conditions. A collaboration interface is defined by its public message handlers and the set of pre and post-conditions that must be met at various execution stages of the collaboration's micro-protocol. Collaborations (and therefore micro-protocols) are composed based on their interfaces.

Collaborations are defined so that they are unaware of identity or existence of other collaborations. They are also ignorant of any message transport mechanisms and the mechanisms for transferring control from message handler to message handler. Thus, collaborations are independently manageable entities of a Web service.

Relationships Among the Components (Connectors)

1. Protocol Sequencing

Generally, protocol sequencing specifies control and data dependencies among collaborations. Sequence and multiplex connects collaborations via pre and post-conditions, i.e., a pre-condition required by a message handler of one collaboration is provided by post-conditions of message handlers from other collaborations. In order to express this, causal relations between call and return events of message handlers are introduced. Causal relations prescribe possible execution sequences of message handlers and micro-protocols.

During execution of a collaboration, call(mh) denotes the event when control is transferred to message handler mh for processing its inbound message. Furthermore, return(mh, Out) denotes the event when message handler mh returns control and has generated messages of the message types listed in Out.

Consider two collaborations $COLL_1$ and $COLL_2$. Event call($mh_1$) causally depends on event return($mh_2$, Out), if return($mh_2$, Out) must have happened before call($mh_1$) can happen. In that case, the corresponding message handlers and collaborations are said to be causally depended also. A typical reason for introducing a causal dependency between collaborations is because a post-condition of one message handler fulfills (part of) the pre-condition of another message handler, i.e., post($mh_2$, Out) $\wedge$ P $\Rightarrow$pre($mh_1$), where $mh_1 \in MH_1$, $mh_2 \in MH_2$, and P is a predicate, so that P $\Rightarrow$pre($mh_1$) is not true. FIG. 1 contains two examples of that kind.

First, a causal dependency may be introduced between the booking collaboration 130 and the flight search 110, i.e., a causal dependency between call($B_1$) and return($F_2$, { }). This would make sense because $F_2$ retrieves the air fare that $B_1$ is going to book.

Second, a causal dependency may be introduced between the booking collaboration 130 and authentication 140, i.e., a causal dependency between call($B_8$) and return($A_6$, $\{A_D\}$). This is done under the assumption that the reservation service must ensure authenticity of message $B_E$, before it can book a flight with the airline. That is, pre($B_8$)="message $B_E$ authenticated". In fact, the authentication collaboration 140 can guarantee something close to that, namely, post($A_6$, $\{A_D\}$)="message $A_C$ authenticated". In other words, the authentication service 140 can validate, if message $A_C$ comes from a trustworthy sender. Apparently, post($A_6$, $\{A_D\}$) does not imply pre($B_8$). However, if $B_E$ and $A_C$ would be transmitted over the network as a composite message, that implication would be true, i.e., post($A_6$, $\{A_D\}$) $\wedge$ $B_E \approx A_C$ $\Rightarrow$pre($B_8$). Protocol multiplexing, discussed hereinafter, allows this to be achieved in a non-intrusive way.

2. Protocol Multiplexing

Generally, protocol multiplexing specifies how micro-protocols share messages that are sent over the network. The present invention recognizes that micro-protocols of two Web service collaborations can follow the same message sequence pattern. In this case, performance can be boosted by transmitting composite messages over the network, instead of sending them separately. Also, integration of many functionalities, such as transaction handling or authentication, would not be feasible without multiplexing of message sequences.

Consider flight search 110 and weather inquiry 120 from FIG. 1. The two collaborations 110, 120 can be composed in different ways. One possibility would be to offer flight search 110, and weather inquiry 120 as two separate services that can be invoked in any order, but only one at a time. An example scenario would be that a customer 105 first searches for a possible destination with nice weather during a specific holiday. Once the customer 105 has found a place, the customer 105 would use the flight search 110 to check out affordable fares. If successful, the customer 105 would then book the flight.

Another option would be to multiplex weather inquiry 120 and flight search 110, so that the customer 105 gets possible fares and corresponding weather information all at once. In that case, only one message is sent over the network that combines messages $F_A$ and $W_A$, and only one message is sent that combines the responses $F_B$ and $W_B$. As a result, the micro-protocols for flight search 110 and weather inquiry 120 would execute simultaneously, as required. This is referred to as composition mechanism protocol multiplexing, because a message sequence is used simultaneously for executing multiple micro-protocols.

While simultaneous execution of flight search 110 and weather inquiry 120 is a matter of choice, it may be mandatory for booking 130 and authentication 140. The authentication service can test, if message $A_C$ comes from a trustworthy sender. This can be capitalized on, if other micro-protocols multiplex their messages with $A_C$. To ensure authenticity of message $B_E$, before the reservation service books a flight with the airline, the four-way handshake for booking 130 should be multiplexed with the four-way handshake for authentication 140. In other words, the following messages are multiplexed: $B_A$ and $A_A$, $B_C$ and $A_B$, $B_E$ and $A_C$, as well as $B_F$ and $A_D$ (the confirmation messages for booking and authentication).

Protocol multiplexing adds great flexibility to the connectors of the disclosed architectural pattern. It is a composition mechanism that allows merging message sequences that belong to different micro-protocols. In other words, instead of sending messages separately over the network, composite messages are transmitted, if the underlying message sequences are compatible.

Consider two collaborations with corresponding micro-protocols $MP_1$ and $MP_2$. A protocol multiplexing is defined for $MP_1$ and $MP_2$ as a relation $MUX \subseteq M_1 \cup \{\epsilon\} \times M_2 \cup \{\epsilon\}$ that meets two major conditions ($\epsilon$ is the empty message): a) only messages that are exchanged between the same sender/receiver pair can be multiplexed, and b) multiplexed message sequences must not interact with each other, so that protocol multiplexing does not change the behavior of any participating micro-protocol.

For example, the composition of flight search 110 and weather inquiry 120 discussed above suggests the protocol multiplexing $MUX_{F\_W}=\{(F_A, W_A), (F_B, W_B), (\epsilon, W_C), (\epsilon, W_D)\}$. Notice that messages $W_C$ and $W_D$ are multiplexed with the empty message, i.e., they are sent over the network as single messages.

3. Exception Handling for Protocol Multiplexing

Exception handling is responsible for compensating operations in case of error situations. If the collaboration of a multiplexed micro-protocol encounters an error situation, it may be necessary to abort other collaborations whose micro-protocols have been multiplexed and take compensating actions. There are two potential reasons for this. First, a collaboration $coll_1$ may causally depend on a specific return event of another collaboration $coll_2$. That event might not occur during execution of the Web service. As a consequence, it must be possible to abort execution of $coll_1$ and all previous operations of $coll_1$ must be reversed. Second, the composed collaborations could bear a transactional semantics in the sense that there is no need to continue with normal execution of the collaborations, if one of them has already failed. As soon as failure of one collaboration is detected, the others could be aborted immediately.

Providing adequate abort operations lies within the responsibility of each collaboration. If a collaboration cannot be aborted, it may not be possible to multiplex its micro-protocol with other micro-protocols. One necessary requirement is that any collaboration $coll_1$ that causally depends on another collaboration $coll_2$ must provide abort operations (it can be an empty operation though).

Abort operations are not triggered from within a collaboration, but from outside. That is, abort operations are public and therefore part of the collaboration interface. The decisions of when to abort a collaboration are expressed as part of protocol sequencing. For that purpose, abort operations can be treated just like regular message handlers. A systematic way of dealing with exception handling is to equip each message handler of a collaboration with an abort operation that can be called due to any kind of compositional error situation. It is noted that abort operations are regular parts of collaborations and their micro-protocols. As a consequence, messages that are generated by abort operations can participate in regular protocol multiplexing.

For multiplexing booking 130 and authentication 140, for example, an abort operation abortBooking can be provided (not shown in FIG. 1), that must be called instead of message handler $B_8$, if its pre-condition $pre(B_8)$ should not hold, while executing the composite reservation service 115. It is also required to provide an abort operation for authentication 140 that can be called instead of message handler $A_6$ in case booking 130 fails with message handler $B_6$.

Properties of the Architectural Pattern

It is a major characteristic of sequence and multiplex that collaborations do not know about identity or existence of other collaborations. Connectors can implement an implicit invocation mechanism for message handlers. A message handler providing a post-condition that matches the pre-condition of another message handler does not directly call that other message handler. Instead, it signals an event to the connector, and lets the connector call the other message handler. While this concept provides the flexibility of common event systems in terms of independent development of components, it does not suffer from the typical validation issues.

An event system allows components to dynamically register and unregister for events, so it is hard to validate what effects the announcement of a specific event will have. The disclosed architectural pattern does not allow collaborations to register for events. Instead, protocol sequencing specifies exactly who the producers and consumers of events are. This allows a very systematic reasoning about Web services. FIG. 1 suggests that a "horizontal" validation is first performed for each individual collaboration, namely flight search 110, weather inquiry 120, booking 130, and authentication 140. For that purpose, it is assumed that for all message handlers of a collaboration their pre-conditions are met, and it must be validated that execution of the micro-protocol correctly establishes all the post-conditions.

After each collaboration has been validated independently, a "vertical" validation is performed for each protocol agent participating in the Web service, namely customer 105, reservation service 115, weather service 125, and airline 125. Causal relations, protocol multiplexing, and micro-protocols prescribe the order of message handler invocations within a protocol agent. This can be used to validate whether the post-conditions in a possible sequence of message handler invocations always meet required pre-conditions, so that message handlers function correctly.

Sequence and multiplex is designed to support incremental development and testing of Web services and their clients. If a Web service becomes rich in functionality, it is desirable to develop a client one collaboration at a time. If message handlers of a collaboration are well encapsulated within the Web service, it should be possible to use the very same message handlers in different test configurations of the Web service. For test purposes, original message handlers of some collaborations can be composed with test message handlers for other collaborations. This allows a client developer to implement and test incrementally. If all message handlers of the Web service are replaced by adequate test versions, compositional logic can be tested separately from the core functionality provided by collaborations.

It may seem that sequence and multiplex enforces a certain code structure within all participating protocol agents. This is not necessarily true. Even if the reservation service 115 (FIG. 1) is structured according to the architectural pattern, the customer 105 could choose a completely different code structure. Apparently, development at the customer site could not benefit from all the advantages of incremental implementation and testing, which partially defeats the purpose of the architectural pattern. However, it is certainly possible that different code structures chosen by different protocol agents are mixed into an interoperable system. Even if none of the protocol agents would implement a code structure that follows the architectural pattern, the advantage of a well-structured Web service interface is present, which is easier to design, validate, and evolve than a more monolithic version.

Architecture: Separation of Service and Compositional Logic

Figure 2:
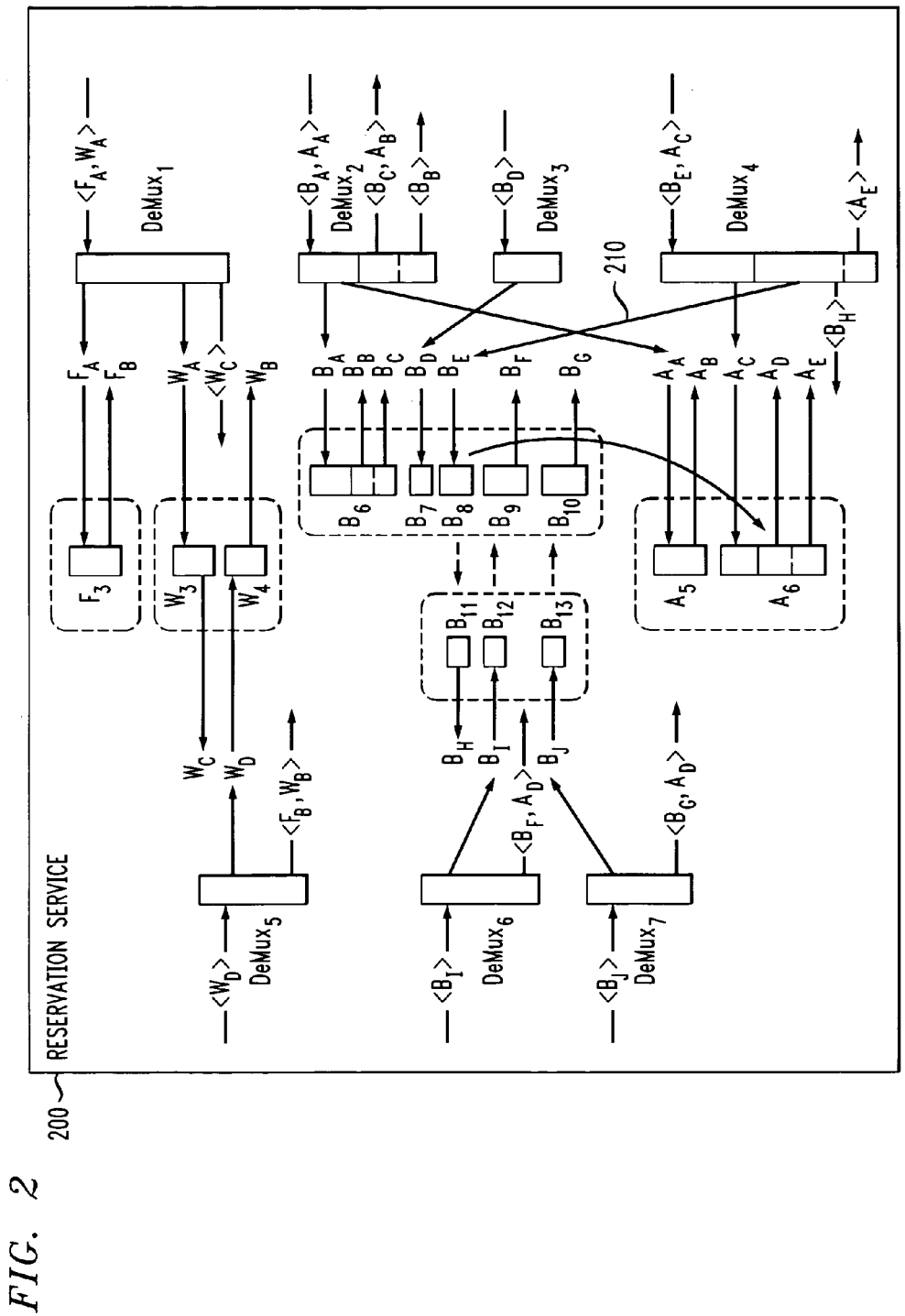
FIG. 2 is a schematic block diagram of the composite reservation service of FIG. 1 incorporating the architectural pattern and protocol multiplexing aspects of the present invention.

FIG. 2 is a schematic block diagram of the composite reservation service 200 of FIG. 1 incorporating the architectural pattern as well as protocol sequencing and multiplexing aspects of the present invention. FIG. 2 illustrates the message handlers $F_3$, $W_3$, $W_4$, $B_6$ through $B_{13}$, $A_5$ and $A_6$ that belong to the reservation service 115 of FIG. 1. As used herein the term "service logic" shall refer to the functionality provided by the collection of message handlers residing on one protocol agent such as the reservation service 115 of FIG. 1. FIG. 2 also illustrates protocol demultiplexers $DeMux_1$ through $DeMux_7$ that implement protocol sequencing and multiplexing for the composite reservation service 200. Notice that implementation of protocol sequencing and multiplexing is distributed across protocol agents that participate in collaborations. That is, there might be additional portions of the implementation at the customer 105, weather service 125, and airline 135. As used herein the term "compositional logic" shall refer to the functionality provided by the collection of protocol demultiplexers residing on one protocol agent such as the composite reservation service 200 of FIG. 2. Compositional logic for sequence and multiplex can be automatically implemented and disclosed implementation principles are the same for each protocol agent, which is why only the reservation service is considered.

According to one aspect of the present invention, the composite reservation service 200 separates service logic, such as the message handlers $F_3$, $W_3$, $W_4$, $B_6$ through $B_{13}$, $A_5$ and $A_6$, from compositional logic, such as the demultiplexers $DeMux_1$ through $DeMux_7$ by means of the architectural pattern sequence and multiplex. In contrast, conventional message handlers contain both service logic and compositional logic. Following discussion illustrates in more detail responsibilities and implementation of the compositional logic.

The larger arrow 210 represents the causal dependency between call event $call(B_8)$ and return event $return(A_6, \{A_D\})$, discussed above. The following composite messages are employed for the protocol multiplexing defined for the four micro-protocols of FIG. 1 (exception handling not included):

$MUX_{F\_W} = \{(F_A, W_A), (\epsilon, W_C), (\epsilon, W_D), (F_B, W_B)\}$,
$MUX_{B\_A} = \{(B_A, A_A), (B_C, A_B), (B_B, \epsilon), (B_D, \epsilon), (B_E, A_C),$
$(\epsilon, A_E), (B_H, \epsilon), (B_I, \epsilon), (B_F, A_D), (B_J, \epsilon), (B_G, A_D)\}$.

Messages $F_A$ and $W_A$ are multiplexed, and protocol demultiplexer $DeMux_1$ is responsible for processing incoming composite message $<F_A, W_A>$. When $<F_A, W_A>$ is received, $DeMux_1$ eventually receives control from a message dispatcher. This is shown in FIG. 2 by the arrow that points to the top of the vertical box for $DeMux_1$ and which is labeled with the incoming message. The protocol demultiplexer $DeMux_1$ is responsible for invoking the message handlers $F_3$ and $W_3$ that process the components (micro-messages) of the composite message.

The protocol demultiplexer must ensure that message handlers are called in the right order so that causal dependencies are met. In the case of message handlers $F_3$ and $W_3$, there are no causal dependencies. Thus, they can be invoked in any order. In FIG. 2, message handler $F_3$ is called first, followed by message handler $W_3$. In addition to demultiplexing an incoming message, a protocol demultiplexer is also responsible for initiating the transmission of generated messages. As shown in FIG. 2, message handler $F_3$ generates message $F_B$ and message handler $W_3$ generates message $W_C$. These messages must eventually be sent over the network, and it is the responsibility of the protocol demultiplexer to trigger sending adequately. Apparently, message $F_B$ cannot be sent immediately after message handler $F_3$ returns, because messages $F_B$ and $W_B$ are multiplexed. Thus, sending of the composite message $<F_B, W_B>$ must be postponed until message handler $W_4$ has been called. However, $W_C$ is ready to be sent, and $DeMux_1$ initiates the sending before it returns control to the message dispatcher. FIG. 2 indicates this by the arrow that originates from the vertical box for $DeMux_1$ and which is labeled with the outgoing message $<W_C>$.

Protocol demultiplexer $DeMux_5$ has standard responsibilities analogous to $DeMux_1$. That is, protocol demultiplexer $DeMux_5$ must invoke message handlers for all components of an incoming message. In case of $DeMux_5$, the incoming message is $<W_D>$. Since $W_D$ is multiplexed with the empty message $\epsilon$, $<W_D>$ has only one component and only one message handler ($W_4$) needs to be called. In addition to the responsibilities mentioned above, $DeMux_5$ continues what has been started by $DeMux_1$. In other words, $DeMux_5$ can now trigger the sending of $<F_B, W_B>$ because all its components have been generated.

All of the responsibilities of $DeMux_5$, except for triggering the sending of $<F_B, W_B>$, can be implemented just as in the case of $DeMux_1$. Message $<F_B, W_B>$, however, must be sent after message handler $W_4$ returns. This decision cannot be made based on knowledge of the input-output behavior of message handlers, causal dependencies between collaborations, and protocol multiplexing. What is needed is a causal dependency within the weather inquiry collaboration 125, namely, the causal dependency between $call(W_4)$ and return $(W_3, \{W_C\})$. Only then can a code generator or developer derive that the composite service first generates message $F_B$ and then message $W_B$.

Protocol demultiplexer $DeMux_2$ also has standard responsibilities analogous to $DeMux_1$. In addition, protocol demultiplexer $DeMux_2$ illustrates how to deal with alternative behavior of message handlers. Message handler $B_6$ either generates message $B_B$ (booking rejected due to invalid fight data) or message $B_C$ (booking continues and fare rules are returned to the customer). Accordingly, protocol demultiplexer $DeMux_2$ shows alternative behavior, too. If fare rules are returned, $DeMux_2$ calls authentication and triggers sending of the composite message $<B_C, A_B>$ because all of its components have been generated. If booking is rejected, there is no need to continue with authentication. Instead, an abort operation should be called for authentication (not shown in FIG. 2) and $DeMux_2$ triggers the sending of $<B_B>$ which may be multiplexed with a response message from the abort operation (also not shown in FIG. 2).

To accomplish exception handling for protocol multiplexing, abort operations can be treated just like regular message handlers, and messages generated by abort operations can also be multiplexed. Thus, exception handling integrates smoothly with the different scenarios introduced so far and no additional mechanisms are needed. Notice that often no abort operations are needed or an abort operation does not generate messages. In that case, empty operations and empty messages can be employed and the techniques described herein still apply.

Protocol demultiplexer $DeMux_4$ is similar to $DeMux_2$. $DeMux_4$ also shows alternative behavior, because authentication (message handler $A_6$) can succeed (message $A_D$) or fail (message $A_E$). If authentication fails, there is no need to continue with booking. Instead, an abort operation should be called for booking (not shown in FIG. 2) and $DeMux_4$ triggers the sending of message $<A_E>$ which may be multiplexed with a response message from the abort operation (also not shown in FIG. 2). If authentication succeeds, $DeMux_4$ calls booking (message handler $B_8$) and triggers sending of message $<B_H>$. Notice that this time the causal dependency between call($B_8$) and return($A_6$, $\{A_D\}$) prescribes the order of invocation.

For code generation, discussed below in conjunction with FIG. 3, the exception handling techniques described above may be employed. In addition, a specification of the call relation between collaborations such as $B_8$ calling $B_{11}$ is needed, so that the code generator knows that message $B_H$ is generated as a result of calling message handler $B_8$. This can be viewed as additional causal relations that are specified as part of protocol sequencing.

Protocol demultiplexer $DeMux_3$ is straightforward, and protocol demultiplexer $DeMux_6$ and $DeMux_7$ also require the specification of intra-collaboration dependencies as discussed for protocol demultiplexer $DeMux_5$.

Automatic Generation of Compositional Logic

Figure 3:
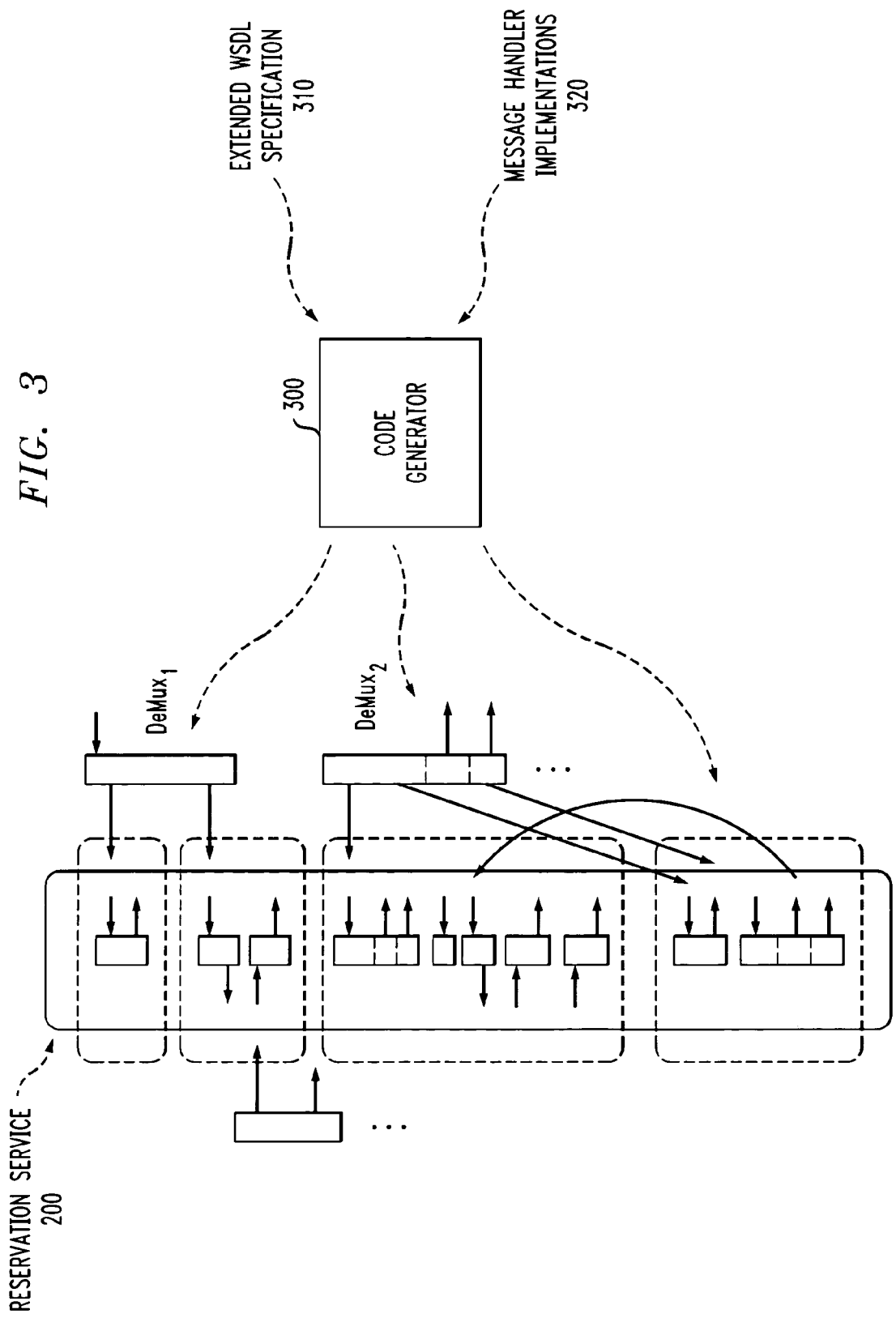
FIG. 3 is a schematic block diagram illustrating a code generator incorporating features of the present invention.

FIG. 3 is a schematic block diagram illustrating a code generator 300 incorporating features of the present invention. As shown in FIG. 3, the code generator 300 can be employed to automatically implement the compositional logic of a Web service resulting from the architectural pattern sequence and multiplex, such as the protocol demultiplexers $DeMux_1$ through $DeMux_7$. The code generator 300 requires a specification 310 of the input-output behavior for each message handler (which roughly corresponds to operation descriptions of a WSDL document), and it needs a specification of the compositional logic, i.e., a description of protocol sequencing and multiplexing.

The code generator 300 produces one protocol demultiplexer per incoming message. Notice that "incoming message" means messages that are sent over the network, i.e., composite messages count as single messages only. Thus, the code generator 300 produces protocol demultiplexers $DeMux_1$ through $DeMux_7$.

The code generator 300 can automatically implement the compositional logic described above in conjunction with FIG. 2 from its input data 310, 320. As discussed further below in conjunction with FIGS. 4A through 4G, the extended WSDL specification 310 includes conventional descriptions of message handlers and micro messages. In addition, the WSDL specification has been extended according to the present invention to provide descriptions of events, composite messages and causal dependencies.

Protocol multiplexing identifies message $<F_A, W_A>$ as a message that is transmitted over the network. From the input-output specifications of message handlers, the code generator 300 can derive that $<F_A, W_A>$ is an incoming message, which means that a protocol demultiplexer for that message must be generated. By means of input-output specifications, components of message $<F_A, W_A>$ can be mapped onto message handlers that will process those components. From causal dependencies, the code generator 300 can derive in which order message handlers can be invoked. Finally, input-output specifications also reveal that messages $F_B$ and $W_C$ have been generated, if the message handlers return, and protocol multiplexing defines which of those are ready to be sent over the network.

FIGS. 4A through 4G illustrate an exemplary WSDL specification 400 in accordance with the present invention that may be used to specify the composite reservation service 200 described in conjunction with FIG. 2 and may be used as input for the code generator in order to automatically implement the compositional logic. Generally, the exemplary WSDL specification 400 includes conventional descriptions of message handlers and micro messages. In addition, the WSDL specification 400 has been extended according to the present invention to provide descriptions of events, composite messages and causal dependencies.

As shown in FIG. 4A, the exemplary WSDL specification 400 includes sections 410, 420 for specifying the flight search and weather inquiry services 110, 120, respectively. The flight search and weather inquiry specifications 410, 420 include conventional aspects, as well as an "event" keyword that is used in accordance with the present invention to introduce causal dependencies. The flight search specification 410, for example, defines the required message handler $F_3$ and the corresponding input and output messages.

FIGS. 4B and 4C, collectively, illustrate the specification 430 for the booking service 130 of FIG. 1. FIG. 4D illustrates the specification 440 for the authentication service 140 of FIG. 1. As shown in FIG. 4D, the message handler $A_6$ does generate an output message at step 450 which establishes the required pre-condition for message handler $B_8$ of the booking service 130. In particular, message handler $A_6$ can also generate an output message of "failure" which would prevent message handler $B_8$ from being called. The causal dependency is further addressed in section 460 of FIG. 4E.

Finally, as shown in FIGS. 4F and 4G, the exemplary WSDL specification 400 includes sections 470, 480 that define the multiplexed messages. Section 472, for example, indicates that a composite message $<F_A, W_A>$ is comprised of inbound micro-messages $F_A$ and $W_A$. Similarly, section 482, for example, indicates that a composite message $<B_C, A_B>$ is comprised of outbound micro-messages $B_C$ and $A_B$.

FIG. 5 is a flow chart describing an exemplary implementation of a protocol multiplexing process 500 for Web service design. Generally, the protocol multiplexing design process

500 identifies the micro-messages that may be integrated into composite messages in accordance with the protocol multiplexing of the present invention.

As shown in FIG. 5, the protocol multiplexing design process 500 initially identifies two or more micro-protocols during step 510 that exchange micro-messages. Thereafter, the protocol multiplexing design process 500 analyzes the message sequence patterns of the identified micro-protocols during step 520.

A test is performed during step 530 to determine if there are any micro-messages having the same sender, receiver and compatible message sequence patterns. If it is determined during step 530 that there are any micro-messages having the same sender, receiver and compatible message sequence patterns, then a composite message is created during step 540 with the identified micro-messages. Thereafter, program control terminates.

FIG. 6 is a schematic block diagram of an exemplary Web service design tool 600 incorporating features of the present invention. The Web service design tool 600 may be any computing device, such as a personal computer, work station or server. As shown in FIG. 6, the exemplary Web service design tool 600 includes a processor 610 and a memory 620, in addition to other conventional elements (not shown). The processor 610 operates in conjunction with the memory 620 to execute one or more software programs. Such programs may be stored in memory 620 or another storage device accessible to the Web service design tool 600 and executed by the processor 610 in a conventional manner. For example, the memory 620 may store one or more WSDL specifications 400, the protocol multiplexing design process 500 and optionally, a code generator 630.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for designing a Web service that processes one or more composite messages, comprising:
identifying service logic comprised of a plurality of message handlers that process micro-messages of said one or more composite messages;
identifying compositional logic comprised of a plurality of protocol demultiplexers that implement Web service functionality for demultiplexing, sequencing, and multiplexing said one or more composite messages;
separating said compositional logic from said service logic, such that said service logic does not include said operations for demultiplexing, sequencing, or multiplexing said one or more composite messages; and
wherein said composite message is comprised of a plurality of micro-messages.

2. The method of claim 1, wherein each of said plurality of message handlers are associated with exactly one collaboration of said Web service.

3. The method of claim 1, wherein said compositional logic includes multiplex and demultiplex operations that implement protocol multiplexing.

4. The method of claim 1, wherein said compositional logic includes sequence operations that implement protocol sequencing.

5. The method of claim 1, further comprising the step of automatically generating code for said compositional logic.

6. The method of claim 1, further comprising the step of applying said identifying and separating steps to the design of clients of said Web service.

7. A system for designing a Web service that processes one or more composite messages, comprising:
a memory; and
at least one processor, coupled to the memory, operative to:
identify service logic comprised of a plurality of message handlers that process micro-messages of said one or more composite messages;
identify compositional logic comprised of a plurality of protocol demultiplexers that implement Web service functionality for demultiplexing, sequencing, and multiplexing said one or more composite messages;
separate said compositional logic from said service logic, such that said service logic does not include said operations for demultiplexing, sequencing, or multiplexing said one or more composite messages; and
wherein said composite message is comprised of a plurality of micro-messages.

8. The system of claim 7, wherein each of said plurality of message handlers are associated with exactly one collaboration of said Web service.

9. The system of claim 7, wherein said compositional logic includes multiplex and demultiplex operations that implement protocol multiplexing.

10. The system of claim 7, wherein said compositional logic includes sequence operations that implement protocol sequencing.

11. A code generator for generating code for a Web service or clients of a Web service that processes one or more composite messages, comprising:
a memory; and
at least one processor, coupled to the memory, operative to:

identify service logic comprised of a plurality of message handlers that process micro-messages of said one or more composite messages;

identify compositional logic comprised of a plurality of protocol demultiplexers that implement Web service functionality for demultiplexing, sequencing, and multiplexing said one or more composite messages, wherein said compositional logic is separated from service logic, such that said service logic does not include said operations for demultiplexing, sequencing, or multiplexing said one or more composite messages;

generating code for said compositional logic; and wherein said composite message is comprised of a plurality of micro-messages.

* * * * *